United States Patent
Delaisse

[19]

[11] Patent Number: 5,983,738
[45] Date of Patent: Nov. 16, 1999

[54] ECCENTRIC SEALED ROTARY DRIVE DEVICE, PARTICULARLY FOR A POSITIVE DISPLACEMENT PUMP

[75] Inventor: Guy Delaisse, Auxerre, France

[73] Assignee: Mouvex, Paris, France

[21] Appl. No.: 08/952,278

[22] PCT Filed: Mar. 18, 1997

[86] PCT No.: PCT/FR97/00479

§ 371 Date: Nov. 18, 1997

§ 102(e) Date: Nov. 18, 1997

[87] PCT Pub. No.: WO97/36107

PCT Pub. Date: Oct. 3, 1997

[30] Foreign Application Priority Data

Mar. 22, 1996 [FR] France .................................. 96 03588

[51] Int. Cl.⁶ ............................. F16J 15/50; F01C 1/02; F01B 19/00
[52] U.S. Cl. .................................. 74/18.1; 418/49; 92/34
[58] Field of Search .................................. 74/18.1, 18.2; 418/49, 50, 51, 52, 53; 417/472; 92/34, 35

[56] References Cited

U.S. PATENT DOCUMENTS

| | | | |
|---|---|---|---|
| 3,247,731 | 4/1966 | Chapman | 74/18.1 |
| 3,252,341 | 5/1966 | Reiter | 74/18.1 |
| 3,364,754 | 1/1968 | Langer | 74/18.1 |
| 3,560,119 | 2/1971 | Busch et al. . | |
| 3,782,685 | 1/1974 | Gallagher et al. | 74/18.1 X |
| 3,782,865 | 1/1974 | Braun . | |
| 4,185,839 | 1/1980 | Allen | 277/105 |
| 4,447,066 | 5/1984 | Katagiri et al. | 74/18.1 X |
| 4,540,019 | 9/1985 | Owoc et al. | 74/18.1 X |
| 4,831,277 | 5/1989 | Christopher | 290/1 A |

FOREIGN PATENT DOCUMENTS 1596943 7/1970 France .
1165435 10/1969 United Kingdom .

Primary Examiner—Tamara L. Graysay
Assistant Examiner—Brandon C. Stallman
Attorney, Agent, or Firm—Browdy and Neimark

[57] ABSTRACT

An airtight rotating driving device with eccentricity, especially for volumetric pump, the device including a bent shaft (1) presenting an input axis (5) and an output axis (10) parallel and off-centered in such a way as to carry out an orbital circular movement, and an airtight and non-rotatable sleeve (14) surrounding the shaft and comprising two metallic bellows (19, 20) linked by a guiding ring (21) mounted longitudinally in a sliding relation on the sloped intermediate section (17) of the shaft. The device converts a rotating movement into an orbital circular movement with an absolute airtightness.

9 Claims, 1 Drawing Sheet

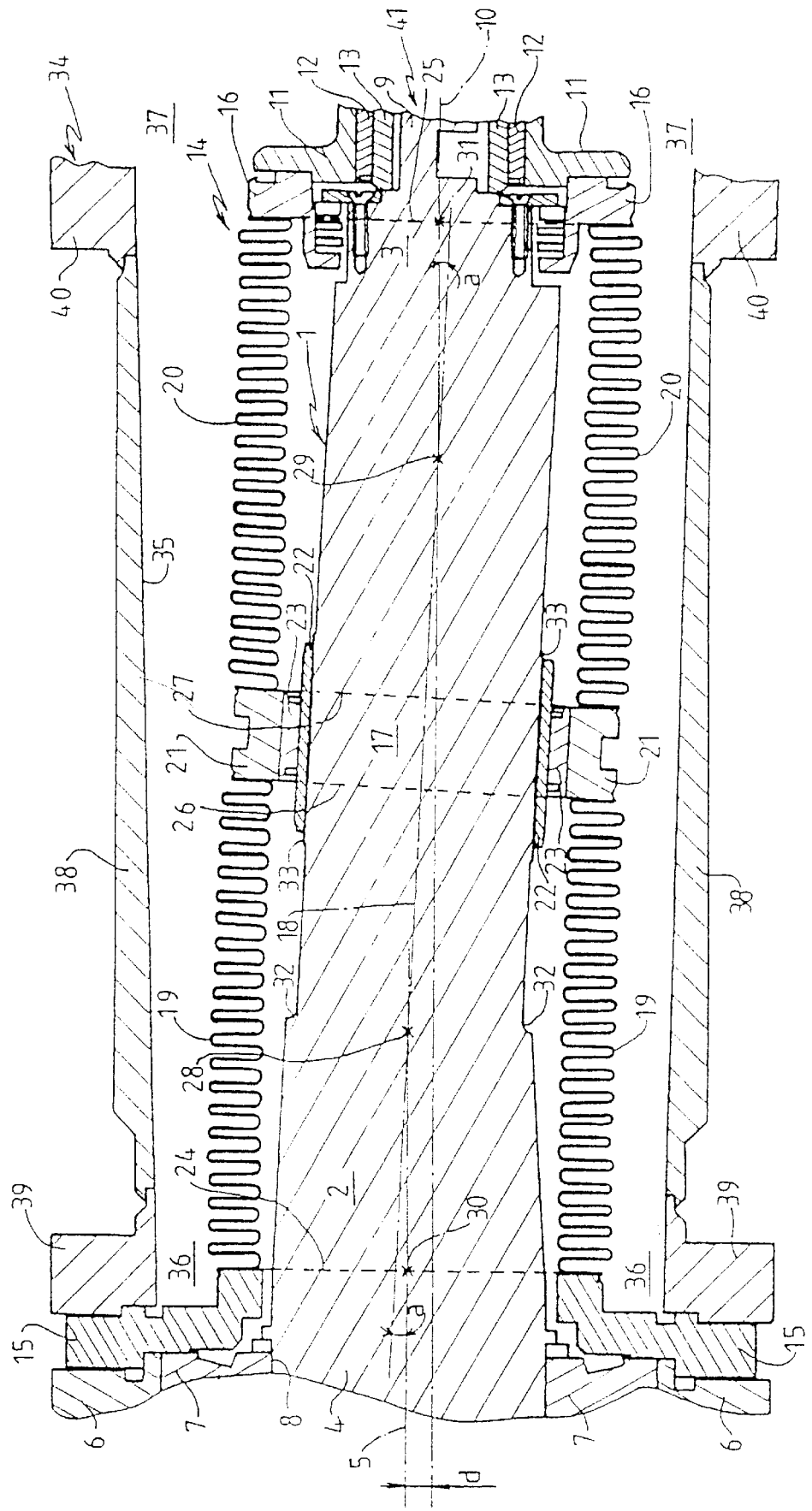

ECCENTRIC SEALED ROTARY DRIVE DEVICE, PARTICULARLY FOR A POSITIVE DISPLACEMENT PUMP

The present invention relates to an airtight rotating driving device with eccentricity, especially for volumetric pump, i.e. a driving device enabling the conversion of a rotary movement into a circular orbital movement, while isolating with an absolute and lasting airtightness, the parts carrying out the orbital movement with respect to those carrying out the rotary movement.

Such a driving device is already used in off-centered or eccentric rotating piston volumetric pumps, and it will be described hereafter with reference to such a pump, being understood that this device may be used also for instance in eccentric screw volumetric pumps, or even may be mounted in order to make up a driving assembly for transmitting a rotating movement in a completely airtight way.

For the application of the device according to the invention, to the driving of an eccentric piston volumetric pump, it is known that in this type of pump, a circular piston carries out an orbital movement inside a cylinder bounded by two circular walls of different diameters. The diameter of the piston ranges obviously between these two diameters. The cylinder is provided with a wall enabling the isolation of the exhaustion and discharge chambers. The piston skirt is interrupted in the alignment of this wall, designated also as partition.

The center of the piston has a circular rotating movement whereas the piston does not revolve around itself, i.e. that the abscissa and ordinate axes remain permanently parallel to their initial orientation.

It is particularly interesting to have available an airtight and non-rotatable sleeve, designated hereafter as <<sleeve>>, around the shaft and all along the whole length of the shaft. The main advantage of such a rotating piston pump with a non-rotatable airtight sleeve, is its absolute airtightness as opposed to other rotating pumps which always require a rotating airtight means (for instance, packing, lipped joint or mechanical gasket).

Another solution to this rotatable airtightness problem consists in a magnetic driving, but this latter has the drawback of not being applicable to all the products which have to be pumped and especially of being expensive.

The solution used heretofore consists in associating to the eccentric piston an elastomer airtight sleeve provided internally with an intricate device, which enables ensuring the conversion of a rotating movement into an orbital movement.

However, apart from the complexity of the internal device of the sleeve, this solution which uses an elastomer sleeve presents a certain number of limitations related to:
  temperature withstand;
  mechanical withstand;
  resistance to pressure differences;
  chemical compatibility with certain products;
  compliance to food standards.

Thus attempt has been made for achieving a stainless steel sleeve. However, it is known that stainless steel bellows and diaphragms can absorb axial distortions and angular distortions but that they present a close limitation to radial distortions. Yet, the principle of operations of the volumetric pump with rotating piston requires inherently a strictly radial distortion at a frequency or angular velocity ranging from 50 to 1000 rpm.

Heretofore, the only possible solution would have led to a considerable lengthening of the bellows, this being incompatible with the overall dimensions required, with the hydrodynamic effects and with the distortion due to the weight of the bellows itself.

The researches which have led to the present invention enable to cope with the above mentioned drawbacks, and to solve the problems considered by providing an airtight rotatable driving device with improved eccentricity which can be used in a volumetric pump with a rotating piston.

Generally, according to the invention, the airtight rotatable driving device with eccentricity, especially for volumetric pump is of the type comprising a shaft having an input section, rotatably supported by a fix bearing and rigidly linked to a rotating driving means, and an output section the axis of which is parallel and off-centered by a distance d, with respect to the input section, in such a way as to describe an orbital circular movement around the said input axis during the shaft rotation, and an airtight sleeve which can be distorted, mounted airtightly between two supporting input and output flanges surrounding rotatably the two opposed input and output shaft ends respectively.

According to one essential characteristic of the invention, the shaft comprises an intermediate sloped section, arranged between the input and output sections, the axis of which is directed according to an angle a with the parallel input and output axes, the supporting input flange is rigidly linked to the fix bearing and the supporting output flange is associated to a pad which airtightly closes the sleeve and inside which a roller is locate inside a recess, the said roller being associated to the output section, the non-rotatable sleeve being made up of two metallic bellows airtightly connected by means of a guiding ring mounted slidingly in a longitudinal direction on the intermediate shaft section, in such a way as any shearing radial distortion of the non-rotatable sleeve is converted into a simple compression-expansion angular distortion of each one of the bellows, each directrix of each bellows being forced to carry out an arc of a circle.

According to other characteristics of the invention:
  the two metallic bellows are identical, preferably of the ringed or corrugated type, and are made of stainless steel, the guiding ring connecting the two bellows being mounted longitudinally in sliding relation with a supporting ring fixed to the sloped intermediate section,
  the optimal value of the angle a is computed in such a way as the respective axes of the two metallic bellows, describe individually, during the rotation of the bent shaft, an arc of circle perpendicular to the respective terminal faces of the sleeve, the said arcs of circle being mutually tangent at the terminal faces located on each side of the linking and guiding ring, the said terminal faces being respectively common to the said ring and to the two bellows,
  the respective intersection points between the axes are located preferably at half-distance between the two terminal faces of each one of the associated sleeves, so that the slope angle a of the intermediate section of the shaft is nearly equal to twice the angle between the input axis and the general direction of the section linking the center of the input terminal face and the center of the output terminal face of the sleeve.

Other characteristics and advantages of the invention will appear more clearly from the following description, made in relation with the enclosed drawing on which the single FIGURE shows a schematic partial section view of a preferred embodiment of an airtight rotatable driving device with eccentricity according to the invention, used by way of example in a volumetric pump with an off-centered rotatable piston.

Referring to the single FIGURE, this latter shows schematically an airtight rotatable driving device with eccentricity, of the type comprising first a shaft generally designated by 1 and having essentially input section 2 and output section 3, with circular cross section.

The input section 2 shows a shaft end 4 with a rotation axis 5. This shaft end 4 is rigidly linked to a rotatable driving means not shown, and having generally the same rotation axis 5 as the said input section 2. Besides, the shaft end 4 is rotatably supported by a fix bearing 6, a conical roller or toggled bearing 7 being arranged between the span 8 of the shaft end 4 and the fix bearing 6.

In the same way, the output section 3 shows a shaft end 9 with a rotation axis 10, parallel and off-centered by a distance d with respect to the rotation axis 5 of the input section 2, in order to describe a circular orbital movement around the said input axis 5 during the rotation of the shaft 1. Besides, the shaft end 9 is rotatably supported by a pad 11 which will be studied more in details hereafter, a roller bearing 12 being arranged between the said pad 11 and a bushing 13 surrounding the shaft end 9.

Furthermore, the pump comprises an airtight sleeve which can be distorted, generally designated by 14, and airtightly mounted between big and small supporting flanges 15 and 16 rotatably surrounding the two opposite shaft ends of the input 4 and the output 9 respectively of the rotating shaft 1. More precisely, the big flange 15 can be held in a fixed position, for instance by means of peripheral stud bolts, against the fix bearing 6 of the input shaft end 4 whereas the small flange 16 may also be held, for instance by means of locking screws, against the pad 11 which airtightly closes the sleeve 14, and which forms a recessed housing, not shown, for the roller bearing 12 supporting the bushing 13 of the output shaft end 9.

According to an essential feature of the invention, the shaft 1 comprises a sloped intermediate section 17, arranged between the input section 2 and the output section 3, and the axis of which 18 makes an angle a with the input axis 5 and the output axis 10. Besides, the sleeve 14 is made up of two metallic bellows 19 and 20, airtightly connected by means of a guiding ring 21 mounted longitudinally in sliding relation on the intermediate section 17 of the shaft 1. Under theses conditions, any shearing radial distortion of the sleeve 14 is converted into a simple compression-expansion angular distortion of each one of the bellows 19 and 20, each directrix of each one of the bellows being forced to carry out an arc of circle.

According to the invention the two metallic bellows 19 and 20 are generally identical and theoretically interchangeable and are of the ringed or corrugated type. They are made up of stainless steel the stiffness of which is such as the rotation of the shaft 1 does not drive the terminal pad 11 of the sleeve 14, the input flange of which 15 alone is fix. Therefore, it is possible to suppress the intricate internal device which was compulsorily provided in the elastomer sleeve in order to ensure the conversion of the rotating movement into an orbital movement.

Besides, the guiding ring 21 linking the two metallic bellows 19 and 20 is mounted longitudinally in sliding relation with a supporting ring 22 fixed to the intermediate slope section 17, a needle bearing 23 may be inserted between the supporting ring 22 and the guiding ring 21. As can be seen in the drawing, the bellows 19 and 20 are not in direct contact with the shaft 1.

According to still another feature of the invention, the optimal value of the angle a is computed in order that the respective axes 5, 18 and 18, 10 of the two metallic bellows 19 and 20, each one describe, during the rotation of the bent shaft 1, an arc of circle perpendicular to the respective terminal faces 24 and 25 of the sleeve 14, the said arcs of circles being mutually tangent at the terminal faces 26, 27 located on each side of the linking and guiding ring 21 the said terminal faces 26 and 27 being respectively common to the ring 21 and to the two bellows 19 and 20.

On the other hand, again according to the invention, the intersection points respectively 28, 29 between the axes 5, 18 and 10 are preferably located at half-distance between the two terminal faces 24, 26 and 27, 25 of each one of the associated sleeves or bellows 19 and 20. As a result the value of the slope angle a of the intermediate section 17 of the shaft 1, has approximately twice the value of the angle between the input axis 5 and the general direction of the section, not shown, linking the center 30 of the input terminal face 24 and the center 31 of the output terminal face 25 of the sleeve 14.

Subsidiarily, the input section 2 is preferably slightly conical and presents a decrease of diameter from the input shaft end 4, provided with a cylindrical span 8 the axis of which is the input axis 5 of the shaft 1, up to an escape bending 32 connecting the sloped intermediate section 17, this latter presenting a circular cross-section of generally constant diameter extending from the escape bending 32 connecting the input section 2 and almost nearly the area of the output shaft end 9, the axis of which is the output axis 10 of the shaft 1.

Besides, the sloped intermediate section 17 comprises an area 33 of a slightly increased diameter located at the intermediate part between the respective intersection points 28, 29 of the sloped axis 18 of the intermediate section 17 with the parallel input axis 5 and output axis 10, and which forms an intermediate span 33 on which is fixed the supporting ring 22 of the guiding ring 21 linking the two metallic bellows 19, 20 and mounted longitudinally in sliding relation with the said supporting ring 22.

According to a possible utilisation of the invention, by inserting in a recess a roller in the end 11 and by inserting in this roller the off-centered end of a crankshaft (or handle) an assembly is achieved enabling the transmission of a rotating movement in an absolutely airtightness condition.

Referring once again to the single FIGURE, this latter represents schematically a preferred utilisation of the driving device according to the invention in a volumetric pump with off-centered rotating piston.

As it is known, such a pump comprises first a fix cylinder, generally designated by 34, and second, an off-centered rotating piston, mounted generally on the end of the sleeve 14.

More precisely, the fix cylinder 34 is made up of a fix cylindrical body (or, cylindrical fixing body) 38 mounted between two ring shaped fix supports 39 and 40, the support 39 being rigidly linked to the fix bearing (or, bearing support) 6 supporting the input section 2 of the shaft 1, the support 40 of the said body 38 being associated to the cylinder 34 of the pump, the piston of which is rigidly linked to the pad 11 which airtightly closes the sleeve 14 and which is supported by the end of the output shaft 9 having a circular orbital movement.

The product which has to be pumped, which may be liquid, fluid or viscous, is located especially between the non-rotatable sleeve 14 and the internal wall 35 of the fix cylinder 34 and moves freely between the inlet area 36 and the exhaust-discharge area 37.

The exhaust-discharge area 37 or the actual pumping area is located beyond the pad 11 which airtightly closes the sleeve 14 and comprises exhaust and discharge chambers, separate from the cylinder 34 by a partition wall, the end of the off-centered piston with a circular orbital movement comprising a skirt interrupted at the alignment with the said partition wall or diaphragm; these known elements are not shown for sake of clarity.

As mentioned hereabove, the driving device according to the invention is located in the cylindrical body 38 of the pump; the big flange 15 which supports the sleeve 14 could be held in a fix position, by means of the said stud bolts, between the fix bearing 6 of the end of the input shaft 4 and the ring-shaped support 39 of the cylinder 34.

According to another possible utilisation of the invention, the driving device is mounted in a volumetric pump with an off-centered screw, not shown. Such a pump comprises generally an off-centered helical screw or rotor, with a single tooth, rotating in a double teeth helical stator, the rotation generating closed volumes moving axially from the exhaust to the discharge. Under such conditions, the pump stator is associated directly or indirectly to the fix bearing 6 supporting the input section 2 of the shaft 1, whereas the off-centered rotor helical screw is associated to the pad 11 and to the output end shaft 9 having a circular orbital movement.

Obviously, the present invention is described and represented only by way of non limitative explanation and any useful modification can be brought thereto, especially in the field of solutions technically equivalent, without departing from the scope of the invention.

What is claimed is:

1. In an eccentric airtight rotating driving device, for a volumetric pump of the type comprising a shaft (1) with an input section (2), rotatably supported by a bearing support (6) and rigidly linked to a rotating driving means, and an output section (3), having an output axis (10) parallel and off-centered by a distance d from an input axis (5) of the input section (2) to describe a circular orbital movement around the input axis (2) during rotation of the shaft (1), and a distortable airtight sleeve (14) airtightly mounted between a supporting input flange (15) and an output flange (16) and rotatably surrounding respectively the opposed input shaft end (4) and output shaft end (9), comprising the improvement wherein:

the shaft (1) comprises a sloped intermediate section (17), between the input section (2) and the output section (3) including an inclined axis (18) making an angle a with the input axis (5) and output axis (10) parallel thereto, the input supporting flange (15) is rigidly linked to the bearing support (6) and the output supporting flange (16) is associated with a pad (11) which airtightly closes the sleeve (14) and in which a roller (12) associated with the output section (3) is mounted in a recess, and the non-rotatable sleeve (14) comprises two metallic bellows (19, 20) airtightly linked by a guiding ring (21) longitudinally mounted in sliding relation on the intermediate section (17) of the shaft (1) in such a way that any shearing radial distortion of the non-rotatable sleeve (14) is converted into a simple compression-expansion angular distortion of each one of the two bellows (19, 20), each directrix of each bellows being forced to carry out an arc of circle.

2. The device according to claim 1, wherein the two metallic bellows (19, 20) are substantially identical, optionally of the ringed or corrugated type, and are made of stainless steel, the guiding ring (21) linking the two bellows being mounted longitudinally in sliding relation with a supporting ring (22) fixed to the sloped intermediate section (17).

3. The device according to claim 1, wherein the input section (2) is slightly conical and presents a decreasing diameter from the input shaft end (4), which comprises a cylindrical span (18) the axis of which is the input axis (5) of the shaft (1), up to a bend (32) connecting the shaft to the sloped intermediate section (17) presenting a circular cross-section with a diameter generally constant over a first area and extending from the bend (32) connected to the input section (2) substantially toward the output shaft end (9), the axis of which is the output axis (10) of the shaft (1).

4. Device according to claim 3, wherein the inclined axis (18) meets the input axis (5) and the output axis (10) at first and second intersection points (28,29), wherein the sloped intermediate section (17) comprises a second area (33) with a diameter slightly greater than that of the first area, the second area being located at the intermediate part between the respective intersection points (28, 29), the second area forming an intermediate span (33) on which is fixed a supporting ring (22) which supports the guiding ring (21), the guiding ring connecting the two metallic bellows (19, 20) and mounted longitudinally in sliding relation with the supporting ring (22).

5. A driving assembly using the device according to claim 1, wherein a roller is mounted in a recess directed externally, in the pad (11), and an off-centered end of a crankshaft is inserted in the roller, thus enabling the assembly to transmit a rotation movement in a completely airtight way.

6. A volumetric pump having an off-centered piston using a driving device according to claim 1, wherein the device is located in a cylindrical fixing body (38), a support (39) being rigidly linked to the bearing support (6) supporting the input section (2) of the shaft (1), a body support (40) of the body (38) being associated with the cylinder (34) of the pump, the piston of which is rigidly linked to the pad (11) which airtightly closes the sleeve (14) and is supported by the output shaft end (9) having an orbital circular movement.

7. The device according to claim 1, wherein:

the two metallic bellows include a first bellows (19) and a second bellows (20);

a first centerline of the first bellows assumes a generally circular first arc and a second centerline of the second bellows assumes a generally circular second arc;

each of the first arc and the second arc is an arc of a respective circle lying in a plane perpendicular to end terminal faces (24,25) of the two metallic bellows; and wherein the angle a is predetermined such that the first arc and the second arc are substantially equal in diameter and are substantially mutually tangent at the guiding ring.

8. The device according to claim 7, wherein the input axis (5) and the inclined axis (18) meet at a first intersection point (28), the output axis (10) and the inclined axis (18) meet at a second intersection point (29), the first intersection point is located approximately halfway between an input terminal face (24) and a first guide ring terminal face (26) facing thereto, and the second intersection point is located approximately halfway between an output terminal face (25) and a second guide ring terminal face (27) facing thereto;

whereby, a connecting line between a first center (30) of the input terminal face (24) and a second center (31) the output terminal face (25) making a center-to-center angle to the input axis (5), the angle a is substantially equal to twice the center-to-center angle.

9. The device according to claim 1, wherein the two metallic bellows are not in contact with the shaft.

* * * * *